United States Patent

[11] 3,575,086

[72] Inventor Lionel G. Davis
 Atlanta, Ga.
[21] Appl. No. 838,852
[22] Filed July 3, 1969
[45] Patented Apr. 13, 1971
[73] Assignee Lockheed Aircraft Corporation
 Burbank, Calif.

[54] ROUTING MACHINE
 11 Claims, 9 Drawing Figs.
[52] U.S. Cl. .................................................. 90/13.5,
 90/13
[51] Int. Cl. .................................................. B23c 1/16
[50] Field of Search .......................................... 90/13.5,
 13.4, 13.7, 13.8, 13.9, 13

[56] References Cited
 UNITED STATES PATENTS
2,116,593 5/1938 Bouvier et al. ............... 90/13.5
2,723,598 11/1955 Mann ............................ 90/13.5
3,145,622 8/1964 Rust et al. ..................... 90/13

Primary Examiner—Gil Weidenfeld
Attorneys—James A. Hinkle and George C. Sullivan ABSTRACT: A routing machine having substantial automatic capability to route one or more workpieces at once which will conform to a template wherein the routing machine has a capability of 360° movement to rout work items of complex radii. The machine in the preferred embodiment comprises a pair of horizontally extending boom arms which are independently rotatable about a central pivot post. Each boom arm has a spindle assembly which moves radially along the boom arm from the centerpost and which carries the tracer to follow a template pattern and a router which cuts a workpiece to duplicate the contours of the template. Each boom arm is complete in itself and is independently controllable to trace a template and to rout workpieces mounted upon workstands whose positions are radially adjustable to fit the configuration of the desired template and workpiece.

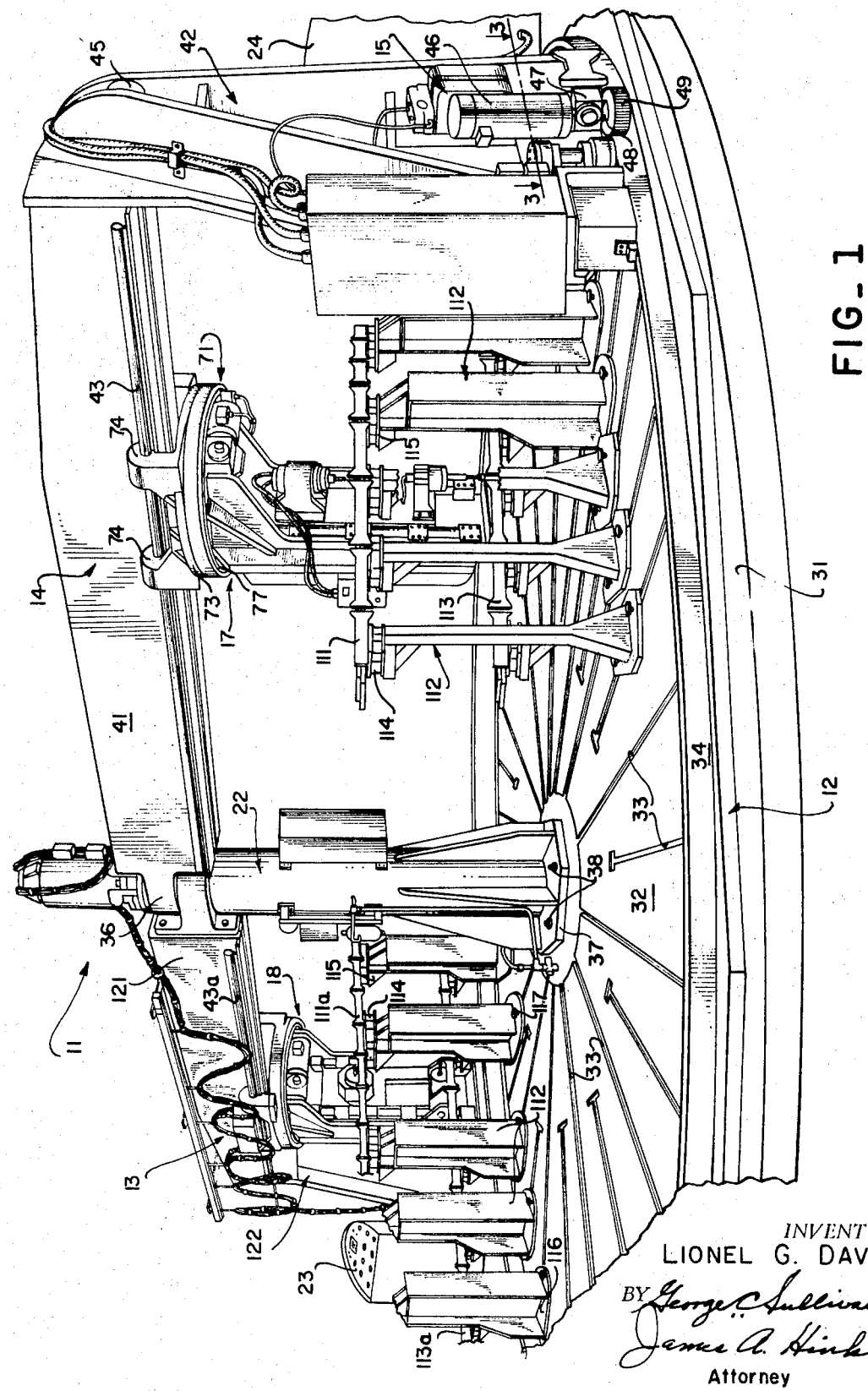

Patented April 13, 1971
3,575,086
5 Sheets-Sheet 2
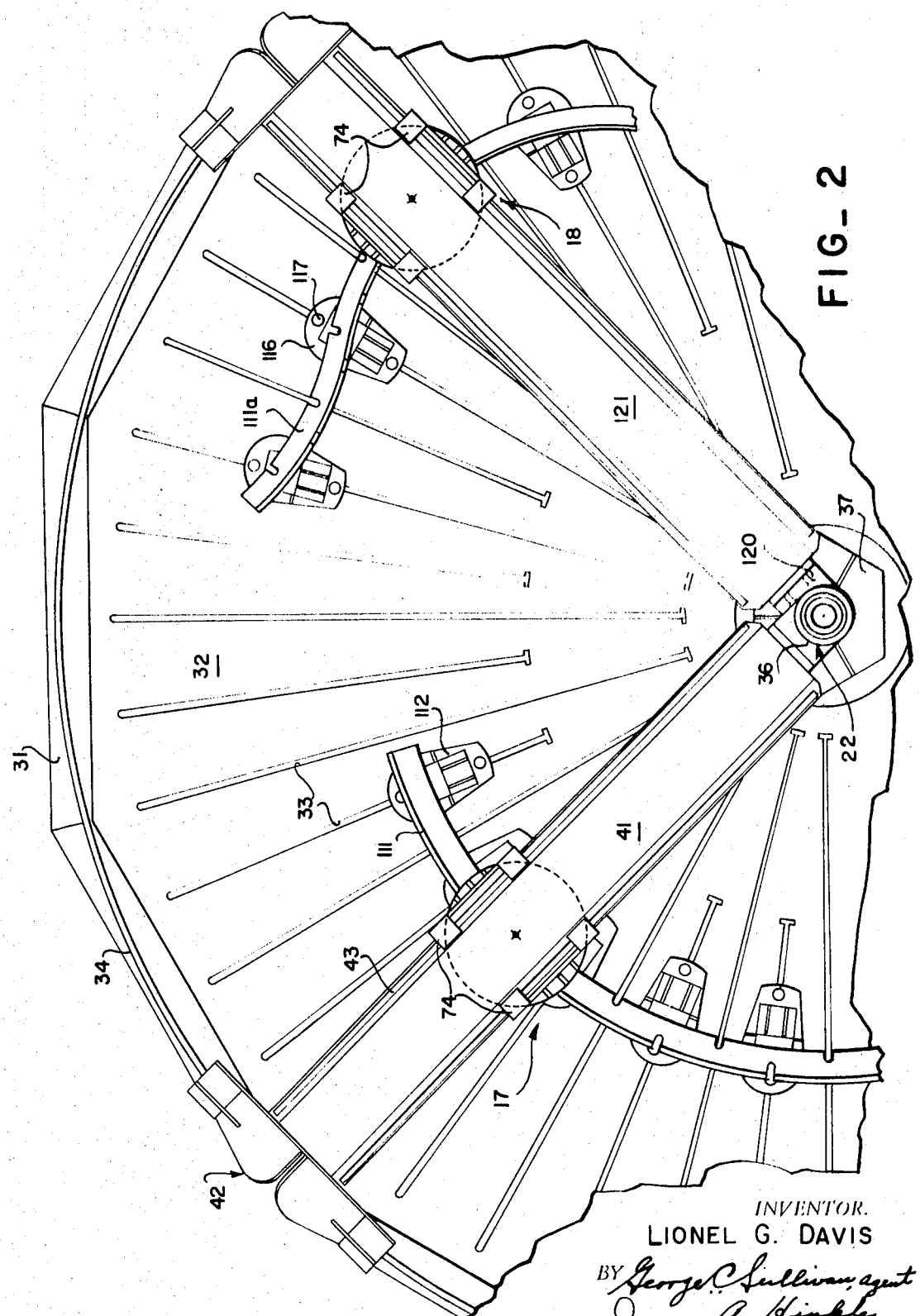
FIG_2
INVENTOR.
LIONEL G. DAVIS
BY George C. Sullivan, agent
James A. Hinkle
Attorney

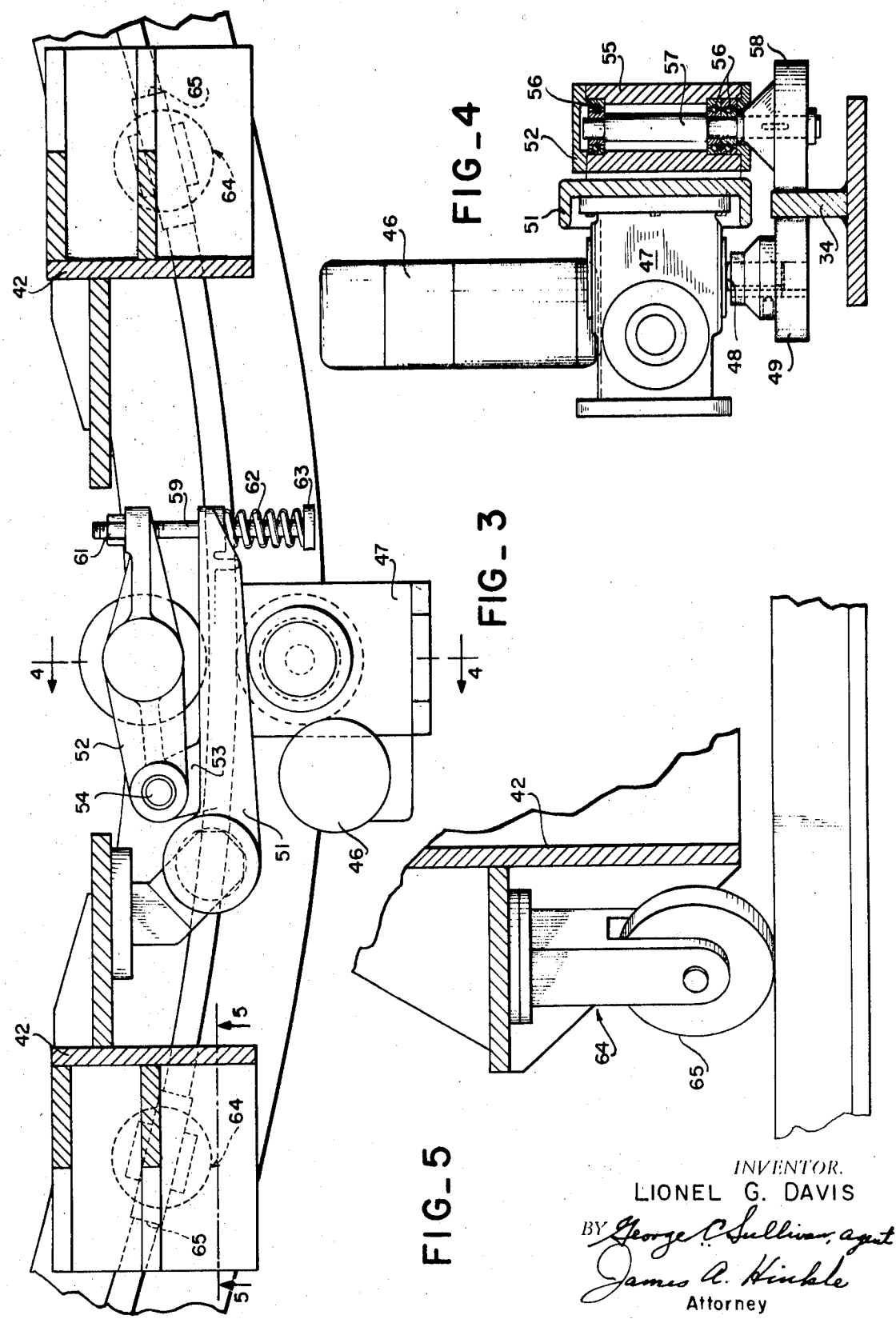

Patented April 13, 1971 3,575,086
5 Sheets-Sheet 4
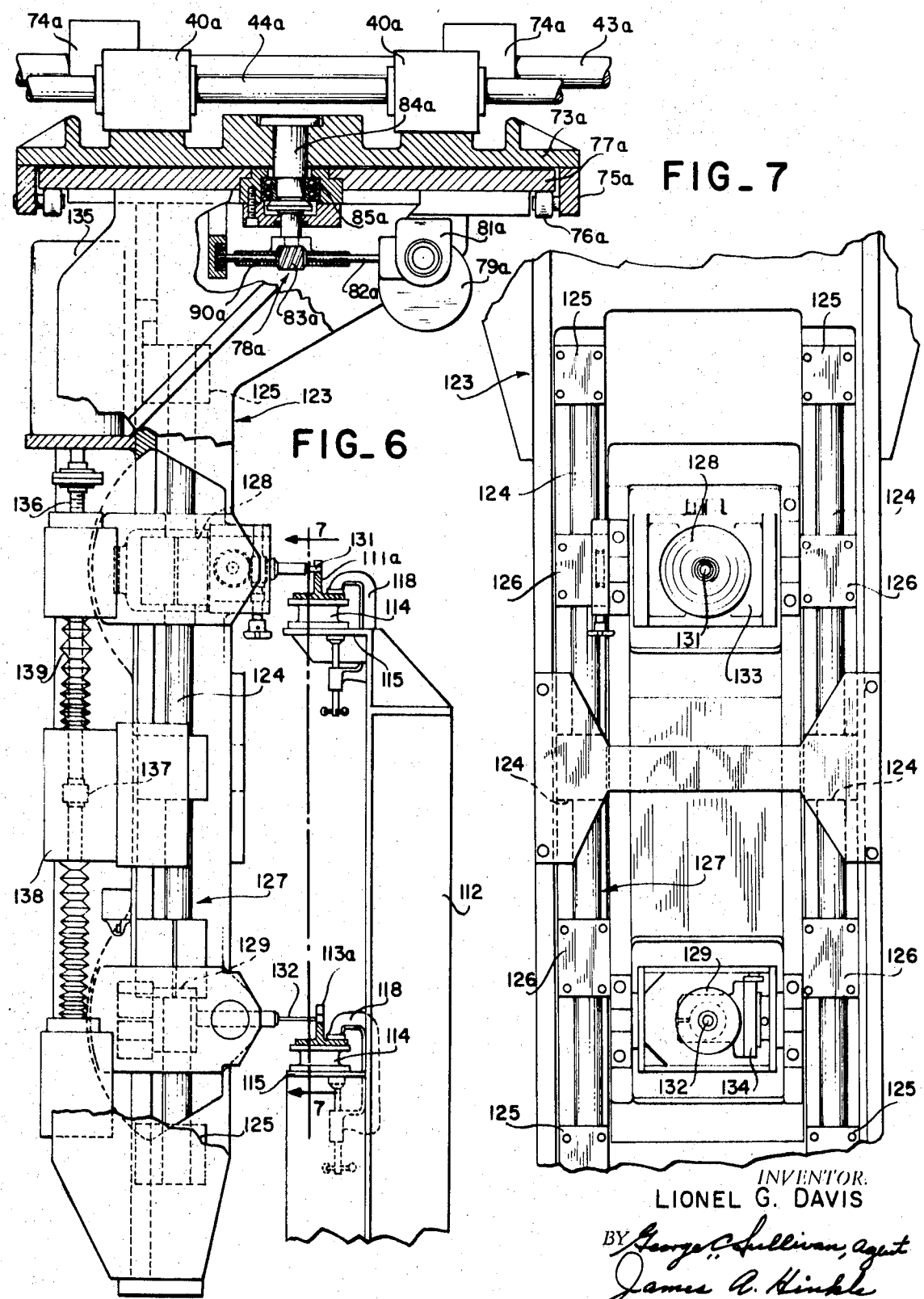
INVENTOR.
LIONEL G. DAVIS
BY George C. Sullivan, agent
James R. Kinkle
Attorney

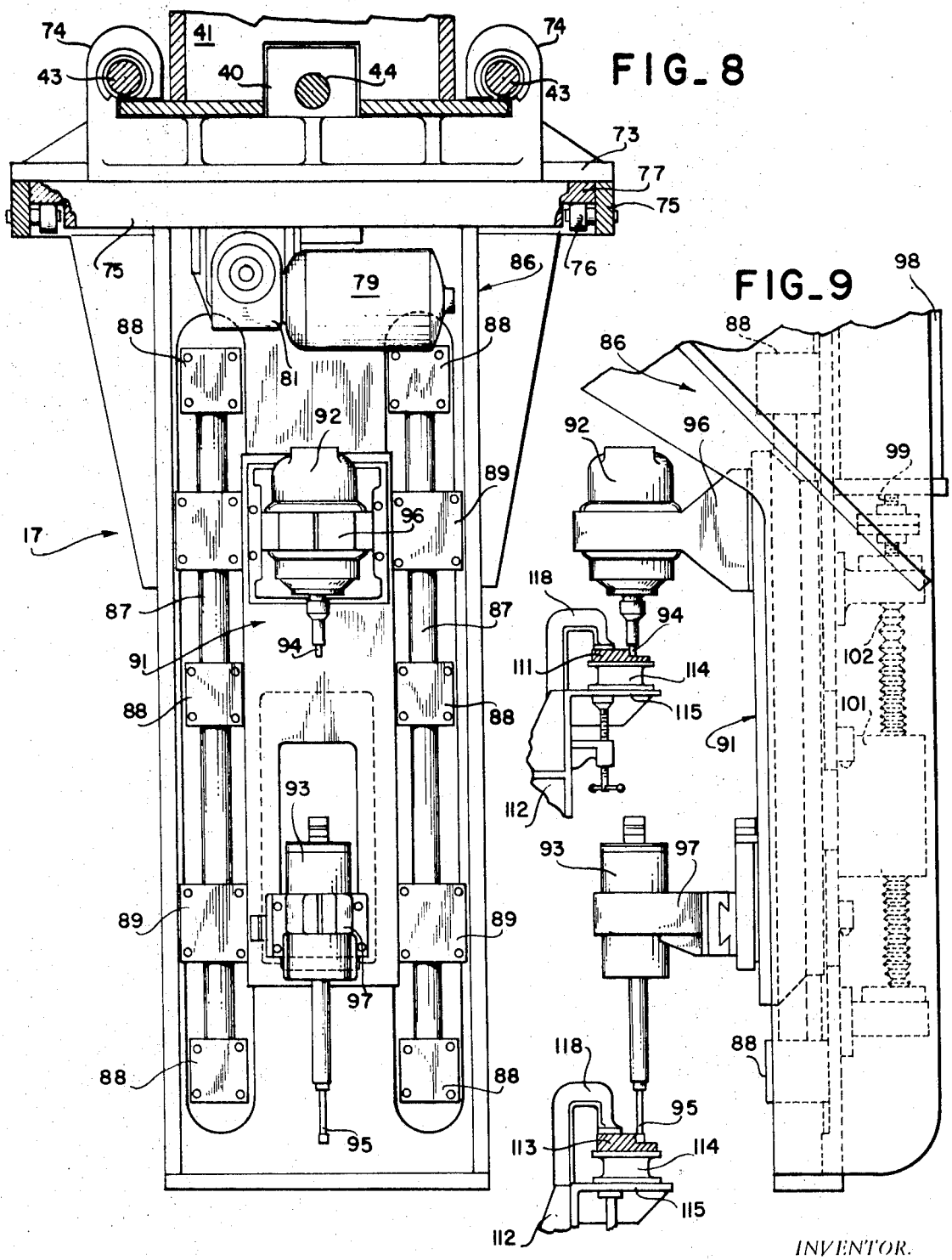

ROUTING MACHINE

The present invention relates to routing machines and more particularly to a routing machine which has 360° capability to rout work items of complete radii and to do so in an automatic mode of operation.

In certain manufacturing operations it is quite frequently desirable to remove substantial amounts of material from workpieces so as to conform the workpiece to a desired configuration. The removal process is frequently conducted with routing machines because of their particular adaptability to this type of machining operation. This is particularly true in industrial operations where metal extrusions are utilized which must be greatly reduced in size and weight and where the final end product must conform to rather complex configurations. A good example is in the aircraft industry where fuselage ribs and other elongated stock must be conformed from normally extruded T-bar stock. In the case of fuselage ribs the T-bar stock is normally stretch formed in a stretch press to accept the shape and radius of curvature for the desired portion of the fuselage in which the particular rib will be utilized.

In the course of the routing operation the workpiece, such as the T-shaped stock described above, will have the desired portions routed away. Such an operation is, of course, dictated by weight, strength, and other design criteria to which the final production piece is to be put. Quite frequently the T-shaped stock or other stock for that matter will be of quite complex configuration and the radius of curvatures will not necessarily be constant over this band of one particular workpiece.

In current industry fabrication methods hand routing is normally employed and each workpiece is operated upon one at a time using independent routing fixtures or blocks with integral cam cutouts specifically designed to the part being worked upon. In practice the aforementioned router blocks are normally placed upon a worktable and then the workpiece is hand clamped into the router blocks which necessitates tightening by hand of several fasteners to maintain the workpiece rigidly secured within the router block. The machine operator then takes the block and hand manipulates the block across the cutting edge of the router bit. As is frequently the case, the router blocks are of very substantial size and this necessitates that there be more than one operator. The obvious size and weight of the large router blocks make this operation extremely difficult and requires specialized cranes for moving the blocks in and out of storage areas. Also, the normal routing operation only machined one workpiece at a time since it has not been feasible to machine several workpieces concurrently due to the size and weight of the router blocks being utilized. It should also be noted that each particular workpiece having a different configuration than the others will need its own router block which is configured to accept only one particular workpiece and this, of course, necessitates a large inventory of router blocks and associated storage areas.

Therefore, a primary object of the present invention is the provision of a routing machine which is automatic in operation and will rout one or more workpieces of curvilinear shape. The routing machine of this invention is proposed to handle the workpieces wherein these workpieces may be clamped in a unitized self-supporting structure which is then fixedly secured to the base of the routing machine to thereby eliminate handling of heavy router blocks. The present invention also includes automatic capability for tracing a pattern and duplicating the pattern upon a workpiece which is not necessarily of constant radius.

The present invention also proposes to automatically rout the workpieces by means of a movable gantry associated with the holding fixtures of the routing machine in a mode which allows independent operation of routers operating in separate vertical and horizontal planes. The gantries supporting the routers of the present invention are capable of 360° movement so as to substantially rout any workpiece within certain limits regardless of its length and radius.

Additionally, the present proposed routing machine will produce parts of high quality and accuracy at a substantial reduction in labor and costs.

Other objects, advantages, and capabilities of the invention will become apparent from the following description taken in conjunction with the accompanying drawings showing only a preferred embodiment of the invention.

In the drawings:

FIG. 1 is an overall perspective view of the router as set forth in this invention;

FIG. 2 is a partial plan view of the router showing especially the boom assemblies;

FIG. 3 is a horizontal section view taken along lines 3-3 of FIG. 1;

FIG. 4 is a vertical section view taken along lines 4-4 of FIG. 3;

FIG. 5 is a vertical section view taken along lines 5-5 of FIG. 3.

FIG. 6 is a partial side elevation view showing portions broken away of the horizontal spindle assembly;

FIG. 7 is a partial vertical section view taken along lines 7-7 of FIG. 6;

FIG. 8 is a front elevation view showing portions and section of the vertical spindle assembly; and FIG. 9 is a side elevation view of the vertical spindle assembly with portion shown in phantom.

Referring to the drawings wherein like reference characters designate corresponding parts throughout the several figures, the routing machine 11 generally comprises certain major subassemblies. Referring in particular to FIG. 1, the main subassemblies of the invention can be identified by the numeral 12 indicating the floor assembly, the horizontal boom assembly 13, vertical boom assembly 14 and the boom drive assemblies 15. Depending from the vertical boom assembly 14 is the vertical spindle assembly 17. Similarly, depending from the horizontal boom assembly 13, is the horizontal spindle assembly 18.

The boom assemblies 13 and 14 are both attached at a central point to the pivot column assembly 22 for rotative movement of 360° therearound. The horizontal boom assembly is controlled by a control panel 23 mounted adjacent its distal end and the vertical boom assembly is controlled by a control panel 24 mounted adjacent its distal end. For the sake of clarity each major subassembly will be described in its entirety insofar as possible under the major headings as set forth below.

FLOOR ASSEMBLY 12

As the present invention is designed to operate in a 360° mode, the floor assembly, consistent with good construction practice, should be generally constructed in a circular fashion. Comprising the floor assembly 12 is an underbase 31 which supports a permanent floor 32 which should be smooth and level and preferably of poured concrete. Located in the floor 32 in a spaced array are evenly spaced radius slots 33 extending generally from the central portion of the circular floor outwardly toward the periphery of the floor. These slots are integral with the floor and generally comprise an inverted T-recess within the floor 32 so as to accept clamping members of the movable workstand, which will be later described. The number of radius slots should be consistent with the number of movable workstands needed to hold workpieces and templates but there should not be such an abundance of slots as to cause crowded conditions upon the floor.

Encompassing the periphery of the floor 32 is a metal circular track 34 which supports each of the boom assemblies 13 and 14. The track 34 must be circular and as nearly concentric with the center point of the floor assembly 12 as possible so as to provide proper tracking capabilities for the boom assemblies

PIVOT COLUMN ASSEMBLY 22

Mounted at the center point of the floor assembly 12 is a vertical pivot column assembly 22 which provides physical support and electrical connections for the boom assemblies 13 and 14. Through the center of the pivot column assembly 22 is a bearing shaft 36 around which are mounted the bearing portions of the vertical and horizontal boom assemblies and about which these assemblies are freely rotatable. The base 37 of the pivot column assembly is affixed to the floor 32 by suitable fasteners 38.

VERTICAL BOOM ASSEMBLY 14

The vertical boom assembly 14 generally comprises a boom arm 41 which is hinged at its proximal end 35 about the pivot column assembly 22 upon the bearing shaft 36 of said column assembly and at its distal end the boom arm 41 is supported by a boom support member 42 which engages the circular track 34 to guide the vertical boom arm assembly 14 in the desired manner. Since the boom arm 41 supports the vertical spindle assembly 17, there is provided a guideway 43 along either side of the boom arm upon which the vertical spindle assembly is slidably mounted. The ways 43 are mounted on the boom arm 41 in such a manner that they are parallel with the top of the workstands and the floor 32 so that a reference plane is provided to maintain the vertical spindle assembly in a vertical mode of operation.

To drive the vertical spindle assembly 17 along the length of the boom arm 41, there is provided a drive shaft 44 lying along the center line of the boom arm and supported at the proximal end of the boom arm in suitable bearings (not shown). The distal end of the drive shaft is driven by a DC electric motor 45.

The boom support member 42 is generally of 'A' frame configuration with the boom drive assembly 15 located at the lower most portion of the support member.

Referring now specifically to FIGS. 3, 4 and 5, the means which provides motive power for the movement of the vertical boom assembly 14 is the drive assembly 15 which includes an electric motor 46 whose output is transmitted to gearbox 47 and thence to the output drive shaft 48 which drives a knurled drive wheel 49. The drive wheel 49 frictionally engages the inner peripheral vertical surface of the track 34 and propels the vertical boom assembly circumferentially about the track 34. In order that firm driving engagement may be maintained between the drive wheel 49 and the track 34, there is provided a stabilizing means which includes a stabilizing arm 51 fixed to the support member 42 and a stabilizing arm 52 which is rotatably mounted upon arm 51 as seen specifically in FIGS. 3 and 4. A bracket 53 has an upstanding bearing shaft 54 that provides the surface about which stabilizing arm 52 is pivoted. Depending from the stabilizing arm 52 is a bearing box 55 in which, at the opposite ends thereof, suitable bearings 56 are mounted to rotatably engage an idler shaft 57 which in turn mounts at its free end an idler pressure wheel 58. The idler wheel 58 is positioned to frictionally engage the outer peripheral vertical surface of the track 34 substantially opposite the wheel drive 49.

To maintain suitable frictional pressure of the wheel drive 49 against the track 34, an adjusting screw 59 is placed through the free ends of the stabilizing arms 51 and 52 with an adjusting nut 61 engaged upon the threaded portion of the screw 59 so that tension between the stabilizing arms may be adjusted. To prevent a binding engagement between the drive wheel 49 and the pressure wheel 58, a stiff spring 62 is positioned about the adjusting screw 59 between its head 63 and the free end of the stabilizing arm 51. As can readily be seen in FIG. 3, if the nut 61 is tightened upon the screw 59, compressive forces attempt to bring the free end of the stabilizing arms 51 and 52 together. This, of course, means that wheels 49 and 58 will exert more pressure against the track 34, and a corresponding amount of frictional engagement between the two wheels will bear against the track. When the correct amount of adjustment is attained so that the wheels are freely movable, yet firmly placed against the opposite sidewalls of the track 34, the boom support member 42 will be properly positioned in a vertical manner relative to the track 34 which is important to maintain the vertical boom assembly 14 upon the track. To provide the horizontal rolling engagement of the assembly 14, a support member 42 has affixed to its flanking lower ends a caster assembly 64 in which the caster wheel 65 engages the upper surface of the track 34. It therefore becomes apparent that the adjusting screw 59 is not only adjusted to provide suitable compression between wheels 49 and 58 upon the track 34, but must be adjusted so as to position the caster wheel 65 precisely upon the upper surface of the track 34 or else the support member 42 will not be maintained in correct alignment.

VERTICAL SPINDLE ASSEMBLY 17

Referring now to FIGS. 1, 8 and 9, wherein the vertical spindle assembly 17 is shown in considerable detail. The entire assembly 17 is affixed for reciprocation relative to the boom arm 41 by means of a carriage 71 and a spindle-rotating assembly 72. The carriage 71 and the spindle rotating assembly 72 are identical for both the vertical spindle assembly 17 and the horizontal assembly 18, and consequently, corresponding parts of each are indicated by similar reference characters with the suffix $a$ denoting the horizontal spindle assembly structure. Reference at this point should also be made to FIG. 7 which shows details of the carriage and spindle-rotating assembly. The upper carriage support plate 73 engages the guideways 43 and the drive shaft 44 so as to impart movement to the entire spindle assemblies. The upper carriage support plate 73 is maintained in contact with the boom arm 41 by means of spaced carriage supports 74 which project upwardly from the support plate and slidably engage the guideways 43.

The upper carriage support plate has a downwardly depending peripheral flange 75 to which is attached, on the inward surface projecting inwardly in a horizontal plane, support rollers 76. These rollers are placed at expedient points around the internal peripheral surface of the flange 75 to adequately support the weight of the lower carriage support plate 77. As is evident, the lower carriage support plate is rotatably mounted upon the support rollers 76 and is rotatable in a horizontal plane by means of a spindle-rotating assembly 78 which includes a drive motor 79 whose output shaft drives a gear reducer 81. The output of the gear reducer 81 is transmitted through drive shaft 82. The precise structure of the rotating assembly is better shown in FIG. 7 and will be described below in conjunction with the horizontal spindle assembly 18. Suffice it at this time to say that the lower carriage support plate 77 is rotatably mounted with respect to the upper carriage support plate 73 and that the spindle rotating assembly 78 is firmly affixed to respective spindle assembly 17 which is in turn an integral part of the respective lower carriage support plate 77. Consequently, when the spindle-rotating assembly 78 is energized, the respective spindle assembly 17 will, with its lower carriage support plate 77, rotate with respect to the upper carriage support plate 73.

Referring now especially to FIGS. 8 and 9, it is seen that attached to the lower carriage support plate 77 is the depending gantry support member 86 to which is affixed the spindle-rotating assembly 78. Along the sides of the gantry support member 86, and spaced from one another, is a pair of gantry ways 87 which are firmly attached to the support member 86 by means of spaced way supports 88. Attached to the gantry ways 87 and in sliding contact therewith by means of way sliders 89 is the vertical gantry 91. The function of the vertical gantry 91 is basically to mount in a fixed vertical relationship the vertical cut router motor 92 and the tracer valve 93 in such a manner that the router bit 94 and the stylus 95 are in the same vertical plane. To maintain the router motor 92 and the tracer valve 93 in their fixed positions, with respect to the gantry 91, there is provided a router motor mount 96 and a tracer mount 97, both of which are firmly affixed to the gantry and encircle the respective mounted items in a firm clamping engagement.

In order to make the correct vertical cuts in a desired workpiece and to correspondingly trace the required cuts in a template, the gantry 91 must have provisions for vertical movement. Accordingly, to effect this movement, a DC electric motor 98 which is firmly attached to the gantry support member 86 drives a threaded shaft 99 which imparts vertical movement to the gantry by means of a fixed nut (not shown) which is housed in enclosure 101. The fixed nut is immovably mounted in the enclosure which is in turn fixedly attached to the gantry support member 86. Consequently, any rotative movement of shaft 99 imparts a vertical movement to the gantry 91. A flexible shaft covering 102 prevents dirt and grit from entering the drive members.

WORKSTANDS 112

In the operation of the present router it is necessary that the workpieces 111 or 111a be fixedly mounted upon a movable workstand 112. In addition to the workpieces being held by the workstands, there is provision made on the workstands to fixedly maintain therewith templates 113 or 113a which guide the various router bits to cut the desired pattern in the workpieces by means of the tracer valve styli following the various contours of the template. The workstands 112 may be of any generalized configuration with a requirement that positioning means 114 be incorporated upon the stand shelves 115 so as to position the workpieces and the templates precisely in vertical alignment with one another so that the styli will trace a pattern from the templates and impart the desired cutouts in precise alignment upon the workpieces.

To maintain the workstands 112 in the radius slots 33 and to fixedly secure the workstands to the floor assembly 12, there is provided in the base 116 suitable fastening means 117 which interlock with the T-shaped radius slots 33 to tighten the workstands in an immovable position upon the floor. Such fastening means 117 should preferably be of a quick release type wherein the operator may easily disengage the fasteners from the floor so that the workstands can be moved in any desired manner to quickly align them with the workpieces and the templates.

The shape of a template obviously determines the positioning upon the floor of the movable workstands and consequently the templates and workpieces are fixed to the workstands, preferably by clamps 118, and the entire configuration is then secured to the floor once correct vertical alignment has been obtained between a workpiece and the template.

OPERATION OF THE VERTICAL BOOM ASSEMBLY 14

Once a workpiece is positioned above the template and the workstands are secured to the floor, the machine operator who is to operate the vertical boom assembly will stand near the vertical control panel 24 and set the necessary controls to move the vertical spindle assembly 17 to the template 113 and workpiece 111. To accomplish this, the energized machine will operate the drive shaft 44, thereby moving the upper carriage along the guideways 43 which will position the tracer valve 93 and the router motor 92 in correct operative relation with respect to the respective template and workpiece.

As the vertical spindle assembly travels reciprocatively along the guideways 43, the tracer stylus 95 is maintained in the template cutout portion so that the configuration of the template is reproduced in the workpiece 111. The following of the template configuration by the stylus causes the control apparatus for the vertical spindle assembly to control both the radial movement thereof and the peripheral movement thereof. A tracer stylus and associated controls, such as is used herewith, are well known in the art and further description is not felt needed for a clear understanding of the invention. In the most normal course of action, the vertical spindle assembly would be initially positioned at one end of the template and workpiece, after which its travel would be down the entire template in a circumferential manner which would necessitate the movement of boom arm 41 around the circular track 34. As has been noted previously, the vertical boom drive assembly 16 causes the boom arm to move circumferentially wherein the proximal end of the boom arm is pivoted about the pivot column assembly 22. Once the vertical spindle assembly 17 has reached the end of the template 113, a signal is sent through the vertical control panel 24 to cause the spindle assembly to shut down until the machine operator can reposition a new workpiece upon the workstands 112, after which the entire cycle would be performed once again.

HORIZONTAL BOOM ASSEMBLY 13

Referring specifically now to FIGS. 1, 6 and 7, it can be seen that the horizontal boom arm 121 and boom support member 122 are similar to their counterparts vertical boom arm 41 and boom support member 42. The boom arm 121 is supported by proximal end pivot 120 upon the pivot column assembly 22 and provides a bearing surface for the proximal end of the boom arm. The boom support member 122 is of substantially the same configuration as boom support member 42 and is driven by a horizontal boom drive assembly which is in all respects identical to the vertical born drive assembly and accordingly, the configuration shown in FIGS. 3, 4 and 5 equally apply.

The horizontal control panel 23, which is affixed to the boom support member 122, controls the movement of the boom arm 121 and the various movements of the horizontal spindle assembly 18.

As has been indicated previously, the horizontal spindle assembly is supported by boom arm 121 by basically the same structure as supports the vertical spindle assembly 17. The common construction of the assemblies is differentiated by the suffix a to the reference characters. This structure comprises a pair of parallel and horizontal guideways 43a which flank the boom arm 121. In addition, down the central portion and interiorly disposed within boom arm 121 is a drive shaft 44a driven by a suitable electric motor mounted on the boom support member 122, which motor is not shown. Attaching the horizontal spindle assembly 18 to the guideways 43a are carriage supports 74a. These four carriage supports are attached to the upper carriage support plate 73a. The drive shaft 43a rotates through a drive-bearing assembly 40a which comprises in each of the drive-bearing assemblies an offset bearing assembly configuration which is offset with relation to the drive shaft, thereby giving a binding effect on the shaft to propel the spindle assembly. In effect, the drive-bearing assembly 40a is a configuration of three roller bearings offset with respect to the drive shaft to thereby produce the necessary binding effect upon the shaft to effect propulsion.

HORIZONTAL SPINDLE ASSEMBLY 18

As was previously noted, the horizontal spindle assembly 18 is quite similar to the vertical spindle assembly and, consequently, like parts have retained like reference characters with the suffix a.

Mounted for relative rotation with respect to the upper carriage support plate 73a is a lower carriage support plate 77a rotatably mounted upon support rollers 76a which are mounted on horizontal shafts affixed to the peripheral flange 75a. A shaft 84a, which is fixed within the upper carriage support plate 73a, projects through the lower carriage support plate which is rotatably mounted about the fixed shaft by bearings 85a. The fixed shaft 84a has mounted at its free end the driven gear 90a which cooperates with the worm drive gear 83a that is driven by drive shaft 82a from the gear reducer 81a and drive motor 79a. This assembly just described is the spindle-rotating assembly which is identical on both the vertical spindle assembly and the horizontal spindle assembly.

As previously described, when the driven motor 79a is energized, the worm gear 83a revolves, thereby interreacting with the driven gear 90a which, since it is affixed to the shaft 84a, is immovable. This interreaction propels the horizontal spindle assembly in a circular direction with the lower carriage support plate 77a imparting the desired rotative movement to the gantry support member 123. Basically, the rotative movement of the gantry support member provides means to maintain the tracer stylus and router bit perpendicular to both the template and workpiece during routing operations which is in addition to radial movements necessarily made by the entire horizontal spindle assembly 18. Of course, the same comments equally apply to the vertical spindle assembly 17.

The gantry support member 123 depends in a vertical manner from the lower carriage support plate 77a and has a configuration much the same as the gantry support member 86 of the vertical spindle assembly. Gantry ways 124 are positioned on flanking sides of the gantry support member in a vertical and parallel manner and affixed to the support member 123 by a plurality of ways supports 125. Attached to the gantry ways 124, and in sliding contact therewith by means of way sliders 126, is the horizontal gantry 127. The function of the horizontal gantry 127 is basically to mount in a fixed horizontal relationship the horizontal cut router motor 128 and the horizontal tracer valve 129 in such a manner that the router bit 131 ant the tracer valve stylus 132 are in horizontal planes which are parallel to one another. To maintain the router motor 128 and the tracer valve 129 in their fixed positions with respect to the gantry 127, there is provided a router motor mount 133 and a tracer mount 134, both of which are firmly affixed to the gantry and encircle the respective mounted items in a firm clamping engagement.

Much in the same manner as described for the vertical spindle assembly 17, there is provided for the purpose of making correct horizontal cuts in a desired workpiece and to correspondingly trace the required cuts in a template means to effect vertical movement of the gantry 127 in addition to the normal radial movement of the entire horizontal spindle assembly 18 outwardly from the pivot column assembly 22. Accordingly, to effect the vertical movement upon the gantry 127, a DC electric motor 135 is firmly attached to the gantry support member 123 and drives a threaded shaft 136 which imparts vertical movement to the gantry by means of a fixed nut 137 that is housed in enclosure 138. As the enclosure 138 is fixedly attached to the horizontal gantry 127, it is seen that as shaft 136 revolves, the stationary nut 137 and the associated enclosure 138 will reciprocate along shaft 136, thereby moving the horizontal gantry 127 in the vertical manner. A flexible shaft covering 139 prevents dirt and grit from entering the drive members.

While the vertical boom assembly 14 and horizontal boom assembly 13 are independently controllable, it can be seen that substantial advantages exist in having a unitary machine upon which workpieces of various sizes and shapes may be routed both horizontally and vertically while utilizing substantial common structure.

OPERATION OF THE HORIZONTAL BOOM ASSEMBLY 13

The operation of the horizontal boom assembly 13 is generally the same as that described for the vertical boom assembly 14 wherein once the workpiece is positioned above the template and the workstands are secured to the floor, the machine operator who is to operate the horizontal boom assembly and spindle assembly will stand near the horizontal control panel 23 and set the necessary controls to move the horizontal spindle assembly 18 to the template and the workpiece. To accomplish this, the energized machine will operate the drive shaft 44a, thereby moving the upper carriage along the guideways 43a to position the tracer valve 129 and the router motor 128 in correct operative relation with regard to the respective templates and workpieces.

As the horizontal spindle assembly travels reciprocatively along the guideways 43a, the tracer stylus 132 is maintained in the template cutout portion so that the configuration of the template is reproduced in the workpiece. The following of the template configuration by the stylus causes the control apparatus for the horizontal spindle assembly to control both the radial movement and the peripheral movement of the assembly 18. In the most normal course of action the horizontal spindle assembly would be initially positioned at one end of the template and the workpiece, after which its travel would be down the entire template in a circumferential manner which would necessitate the movement of boom arm 121 around the circular track 34. As was previously noted, the boom drive assembly 15, which is mounted on the horizontal boom support member 122, causes the boom arm to move circumferentially wherein the proximal end of the boom arm is pivoted about pivot column assembly 22. Once the horizontal spindle assembly 18 has reached the end of the template 113a, a signal is sent through the horizontal control panel 23 to cause the spindle assembly to shut down until the machine operator can reposition a new workpiece upon the workstands 112, after which the entire cycle would be performed once again.

I claim:

1. A routing machine comprising an upright pivot post, a pair of radially extending boom arms pivotally mounted upon the pivot post for independent rotation therearound, control means associated with each boom arm adapted to operatively control all movements of the respective boom arms, a support fixture mounted for reciprocative movement along each boom arm, routing means and template-tracing means affixed to each of the support fixtures, holding means having locking surfaces for maintaining a template and a least one workpiece in operative alignment, means to cause the template-tracing means to follow contours in the template, the routing means being mounted in direct controlled relation to the movement of the tracing means and adapted to operatively engage the workpiece so as to rout the workpiece corresponding to the configuration of the template.

2. A routing machine comprising a base member of generally circular configuration supporting the machine, a track mounted upon the base in a peripherally extending circle, holding means movably mounted on the base, the holding means having locking surfaces for maintaining a template and at lease one workpiece in operative alignment, an upright pivot column assembly mounted upon the base member at the center thereof, at least one radially extending boom arm supported in driving engagement with the base member track for arcuate movement, control means for the boom arm, the control means adapted to operatively control all movements of the boom arm, the boom arm having guideways mounted thereupon along the longitudinal length of the boom arm, the guideways being parallel to the base member, a spindle assembly mounted for reciprocative movement along the guideways, tracer means affixed to the spindle assembly for movement therewith and adapted to operatively engage the templates, cutting means affixed to the spindle assembly for movement therewith in direct controlled relation to the movement of the tracer means and adapted to operatively engage the workpiece, whereby when the boom arm traverses the peripheral track the tracer follows the template thereby controlling the location of the spindle assembly and causing the spindle assembly to move the cutter means to operatively rout the workpiece corresponding to the configuration of the template.

3. A routing machine as claimed in claim 2, wherein the boom arm has proximal and distal ends, the proximal end of the boom arm mounted upon the pivot column assembly for rotative movement therearound, a boom support member supporting the distal end upon the base member track, drive means mounted on the boom support member and in driving engagement with the track to thereby propel the boom support member circumferentially around the track.

4. A routing machine as claimed in claim 3, wherein the spindle assembly has an upper carriage support plate mounted for movement on the guideways, a lower carriage support plate mounted to the upper plate for relative rotation therewith in a horizontal plane.

5. A routing machine as claimed in claim 4, wherein the spindle assembly has a pair of flanking guideways fixed to the lower carriage support plate upon which a gantry is mounted for vertical movement, the tracer means and the cutting means being mounted on the gantry for vertical movement therewith.

6. A routing machine as claimed in claim 5, wherein the base member has a plurality of slots in the base projecting radially outward from the center of the base, the holding means adapted to be matingly engaged and selectively interlocked with the slots.

7. A routing machine comprising a base member of generally circular configuration supporting the machine, a track mounted upon the base in a peripherally extending circle, holding means movably mounted on the base, the holding means having locking surfaces for maintaining a template and at least one workpiece in operative alignment, an upright pivot column assembly mounted upon the base member at the center thereof, a plurality of radially extending boom arms having proximal and distal ends, the proximal ends of the boom arms mounted upon the pivot column assembly for rotative movement therearound, means supporting the distal ends in driving engagement with the base member track for arcuate movement, control means for each boom arm, the control means adapted to operatively control all movements of the respective boom arm, each boom arm having supporting means mounted for reciprocative movement along the boom arm, tracer means affixed to the supporting means for movement therewith and adapted to operatively engage the template, cutting means affixed to the supporting means for movement therewith in direct controlled relation to the movement of the tracer means and adapted to operatively engage the workpiece, whereby when each boom arm traverses the peripheral track the tracer follows the template thereby controlling the location of the supporting means of each boom arm and causing the supporting means to move the cutter means to operatively rout the workpiece corresponding to the configuration of the template.

8. A routing machine as claimed in claim 7, wherein each distal end of the boom arms has a support member in rolling engagement with the base member track, drive means mounted upon each of the boom support members and in driving engagement with the track to thereby propel each of the boom arms independently of one another circumferentially around the track.

9. A routing machine as claimed in claim 8, wherein each boom arm has guideways mounted thereupon along the longitudinal length of the boom arms, the guideways being parallel to the base member, the supporting means comprising a spindle assembly mounted for reciprocative movement along the guideways, movable gantry means associated with the spindle means, the gantry means being vertically movable along a pair of flanking guideways of the spindle assembly, the tracer means and cutting means being mounted on the gantry for vertical movement therewith.

10. The routing machine as claimed in claim 9, wherein the spindle assembly has an upper carriage support plate mounted for movement along the guideways, a lower carriage support plate mounted to the upper plate for relative rotation therewith in a horizontal plane.

11. The routing machine as claimed in claim 10, wherein the base member has a plurality of slots in the base projecting radially outward from the center of the base, the holding means being matingly engaged with said slots for movement therein and selective interlocking therewith.